INVENTOR.
LOUIS B. STEGGEMAN
BY
ATTORNEY

Nov. 10, 1959 L. B. STEGGEMAN 2,911,764
GRINDING MACHINE
Filed Sept. 6, 1957 5 Sheets-Sheet 2

INVENTOR.
LOUIS B. STEGGEMAN
BY Allen M Kross
ATTORNEY

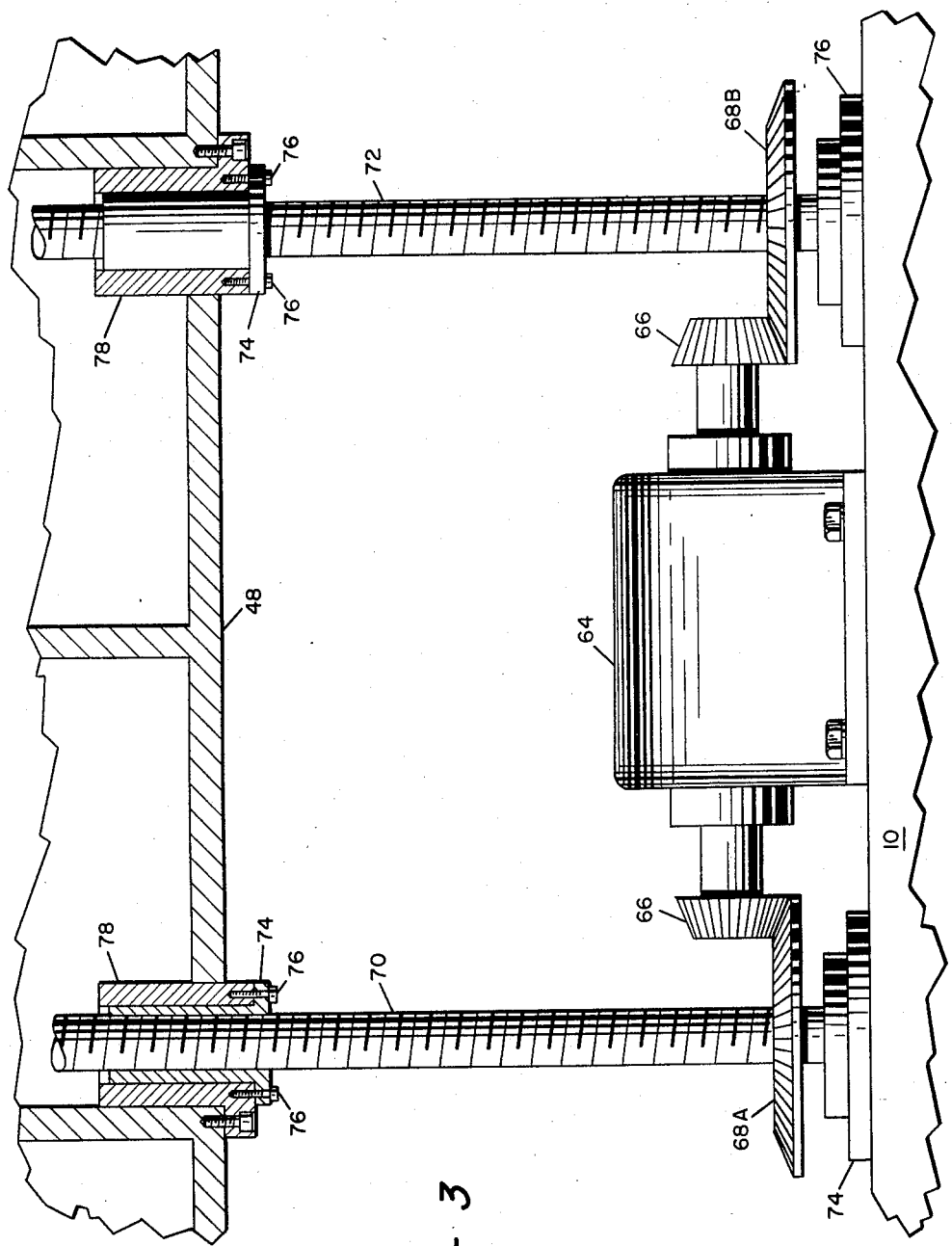

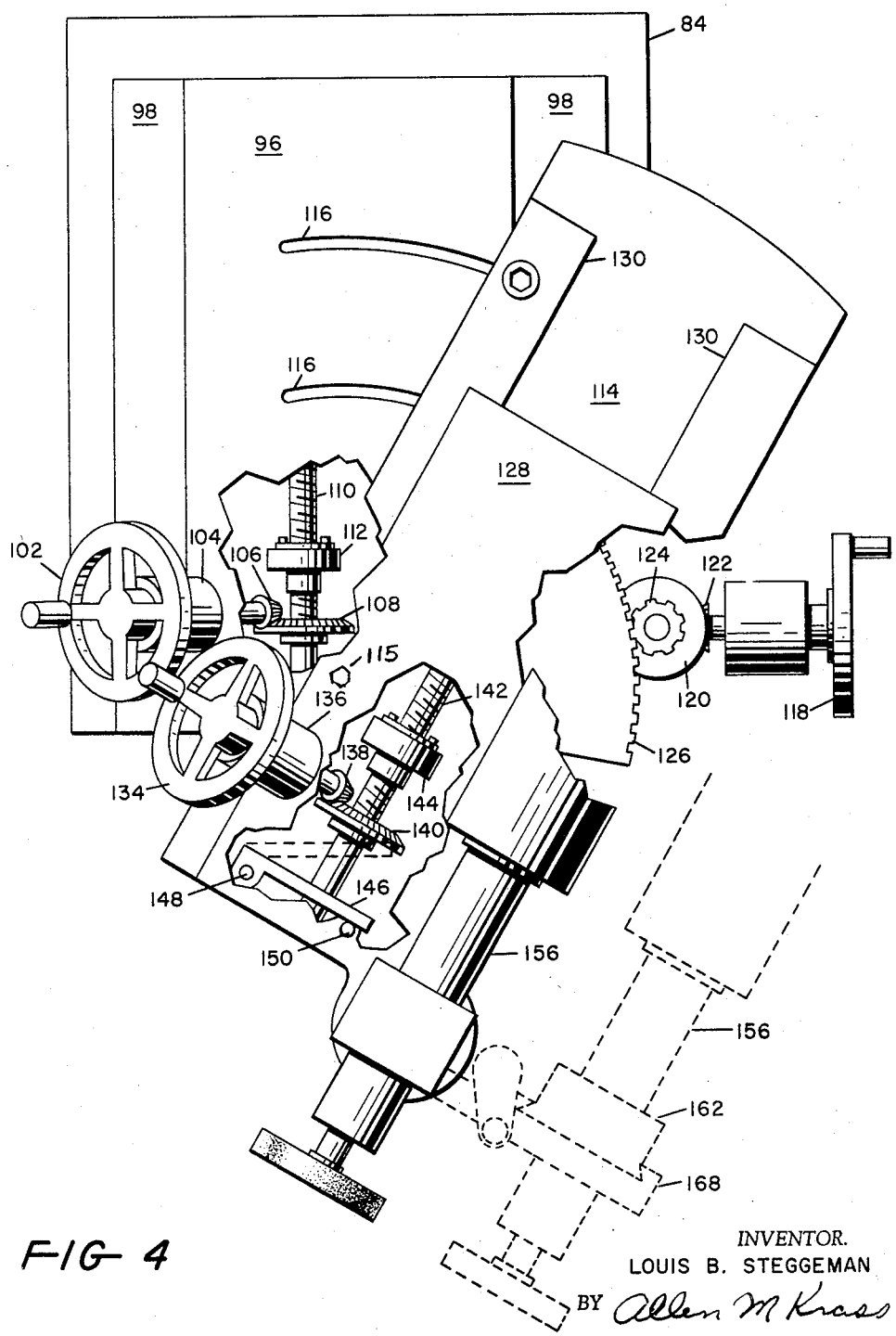

United States Patent Office 2,911,764
Patented Nov. 10, 1959

2,911,764
GRINDING MACHINE
Louis B. Steggeman, Grosse Pointe, Mich.
Application September 6, 1957, Serial No. 682,347
6 Claims. (Cl. 51—106)

This invention relates to a grinding machine and more particularly to a precision grinder which is capable of performing a wide variety of diverse operations on a workpiece without requiring the workpiece to be readjusted in the machine's chucking mechanism.

Grinding is a high precision operation used where finished surfaces must be produced within very close tolerances. On workpieces which have a plurality of finished surfaces these surfaces must often be disposed in exact positions with respect to one another. While it is desirable, in the interest of economy, to have a single machine which will perform all necessary grinding operations, such a machine does not provide greater accuracy than a number of machines which are each capable of performing a single operation if it is necessary to readjust the position of the workpiece in its holder between successive operations. The present invention contemplates a high precision grinding machine which is capable of performing a wide variety of grinding operations such as grinding internal and external diameters, tapers and slots and which can perform any desired sequence of these operations on a particular workpiece without adjusting the position of the workpiece in the work holding means.

The ability to perform diverse operations without adjusting the position of the workpiece in the holder allows the various tool settings to be made with a very high degree of accuracy with respect to one another. For example, if a tapered surface must be ground in a particular plane relative to a horizontal surface and the two surfaces may be ground in the same machine without adjusting the workpiece between operations, the two surfaces may be ground with accuracy that is only a function of the ability to adjust the machine's slides with respect to one another. However, if the workpiece had to be relocated between operations the positional accuracy of the two surfaces would also be decreased by the inaccuracy of that setting.

While machines have been known to the prior art which could cut a plane surface and a tapered surface relative to one another without readjusting the workpiece, the present invention provides a grinder in which any known sequence of grinding operations may be performed on a single machine without adjusting the workpiece position.

In order to achieve the aforegoing objective, the present invention utilizes a novel grinder structural arrangement. Among the structural features is the utilization of two vertical posts as an adjustable main support for the machine and the provision of a unique screw adjustment mechanism which allows the various heads to be disposed in an exact horizontal plane on the two vertical columns.

Another novel structural feature is the provision of auxiliary slides which allow the spindle to be moved in true vertical or horizontal directions relative to tapers without disturbing those taper adjustments.

Another unique feature is the provision of special large size anti-friction bearings which cooperate with the diameter grinding section of the apparatus in such a way as to allow the machine to cut either internal or external diameters with high standards of accuracy.

These and other features of the machine are particularized in the following description of a specific embodiment of the invention. The description makes reference to the accompanying drawings, in which:

Figure 3 is a partially sectionalized elevation view of the vertical elevating mechanism of the preferred embodiment;

Figure 4 is a detailed section, partly broken away, of certain of the slides in the preferred embodiment;

The machine is supported on a base 10 constructed from formed and welded steel plate. The base 10 is generally triangular in shape, having a large radius in one of the points of the triangle and smaller radii at the other two points. The hollow interior portion of the base 10 is almost totally enclosed by the sides.

Figure 6:
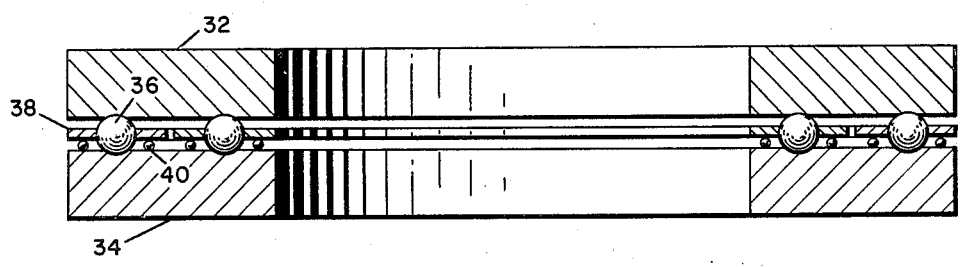
Figure 6 is a sectional view of the work supporting table ball bearing.
Figure 7:
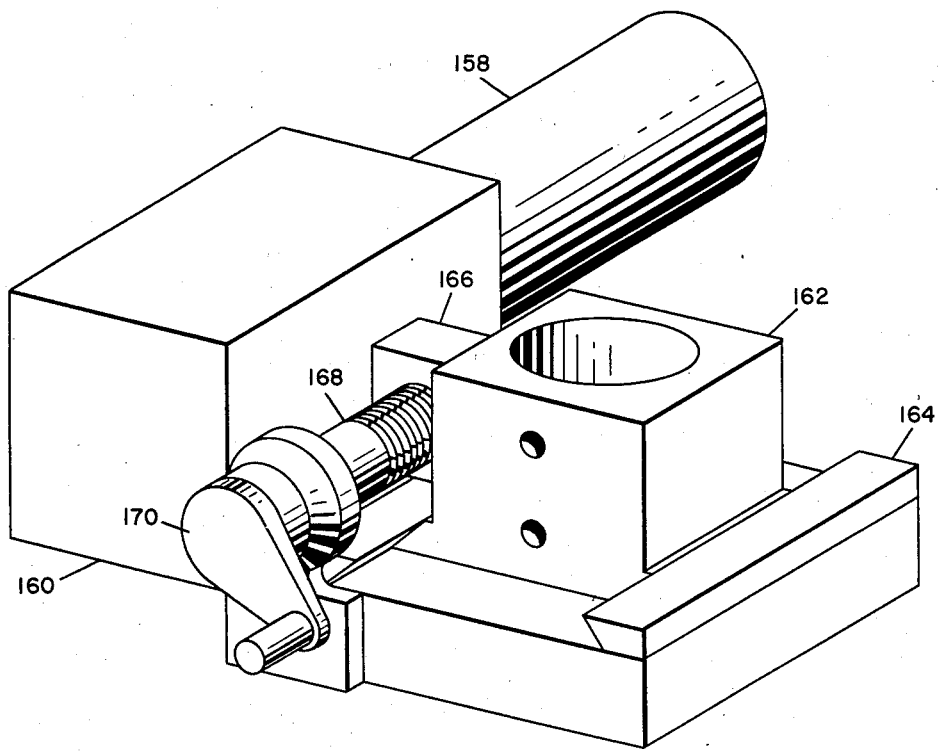
Figure 7 is a perspective view of a spindle attachment which is utilized in connection with the machine and which is not shown in Figure 1.

A circular work table 12 having a plurality of holes 14 disposed along radial lines is rotatably supported on the base 10 by a ball bearing 16 which is shown in detail in Figure 6. A workpiece 18 is supported on the table 12 by means of clamps 20 which abut opposed edges of the workpiece 18 and which are fixedly attached to the table 12 through use of the bolt holes 14. When workpieces of shapes other than rectangular are to be supported on the table 12 a plurality of clamps 20 may be disposed about their edges to maintain them in a fixed position with respect to the table. Other types of clamps which surround the workpiece may be used on workpieces of different configuration. A plurality of bolt holes 14 allow almost any shape to be attached on the table.

A vertically disposed downward directed shaft 22 projects from the bottom of the table 12 and has a cog gear 24 disposed on its lower end. A cog belt 26 connects the gear 24 and the shaft 22 to the output gear 28 of a direct current adjustable speed motor 30 which is fixed to the outer side of the base wall 10. A rheostat or other direct current control means may be utilized to vary the speed of the motor 30 and thus control the speed of rotation of the table 12.

This rotation is employed when internal or external diameters are ground. The grinding spindle, which will be described in detail subsequently, is maintained in a fixed position while the table 12 and its attached workpiece is rotated. It is essential that the table 12 be rotated with a minimum of friction since any friction causes bearing wear and a resultant lowering of the accuracy of the positional location of the table.

As shown in Figure 6 the bearings are composed of a top race 32, an identical lower race 34 and a plurality of balls 36 which are disposed in depressions in each of the races and which are maintained at a distance from one another by a retainer ring 38. The retainer ring is annular in shape and has a plurality of holes located about its thickness at regular intervals with respect to one another. The holes are large enough to allow the balls 36 to pass through and thereby constrain the balls to appropriate points in the annular recesses in the races 32 and 34. Normally, as the races rotate the retainer ring 38 is dragged along the surface of the lower race 34.

However, the present invention places three small balls 40 in the ring at points between the balls 36. The balls 40 act only to maintain the retainer ring 38 on its own rolling surface so that it does not create a drag on the main balls 36.

Two hollow cylindrical columns 42 are fixed in vertical attitudes above the base by pedestals 44 which are integral with the columns 42 and which are fixed to the top side of the base at the two corners having small radii. At the upper end of the columns 42 an inverted T-shape girder 46 is fixed between the two columns so as to complete a rigid framed structure.

A horizontal cross rail 48 has two bosses 50 projecting from its rear side. These bosses have vertical holes 52 projecting through from the top side of the cross rail 48 to the lower side. The holes 52 embrace the vertical columns 42 so as to confine the cross rail 48 to movement in a vertical plane parallel to the two columns 42. The forward edge of each of the columns 42 has a plurality of small holes 54 forming a line on its surface. Small stop pins may be placed in the holes 54 at equal heights on each of the two columns 42 in order to support the cross rail 48 in that position. Additionally, brake members 56 are disposed on the rear surface of each of the bosses 50. A handle 58 on the brake may be manually actuated so as to fixedly position the cross rail 48 on the columns 42.

The weight of the cross rail 48 is counter-balanced by weights that are disposed internally of the hollow vertical columns 42 (not shown). These weights communicate with the cross rail through chains 60 which travel over pulleys 62 which are supported on the T-beam 46.

The vertical movement of the cross rail 48 along the columns 42 is powered by a second D.C. electric motor 64 which is supported on the top side of the base 10 in a position intermediate of the two columns 42. The motor is shown clearly in Figure 3. The motor is double ended and each output shaft drives a bevel gear 66. The gears 66 in turn drive horizontally disposed bevel gears 68a and 68b. The gear 68a shown to the left in Figure 3 drives a shaft 70 which has a right-handed screw thread disposed along most of its surface. The right-hand gear 68b is drivingly connected to a second shaft 72 which has a left-handed screw thread cut on most of its surface. At their lower ends the shafts 70 and 72 are journalled in bearings 74 and 76 which are supported on the top surface of the base 10. At their upper ends the shafts 70 and 72 are journalled in bearings 79 and 81 which are retained in the inverted T-beam 46.

Figure 1:
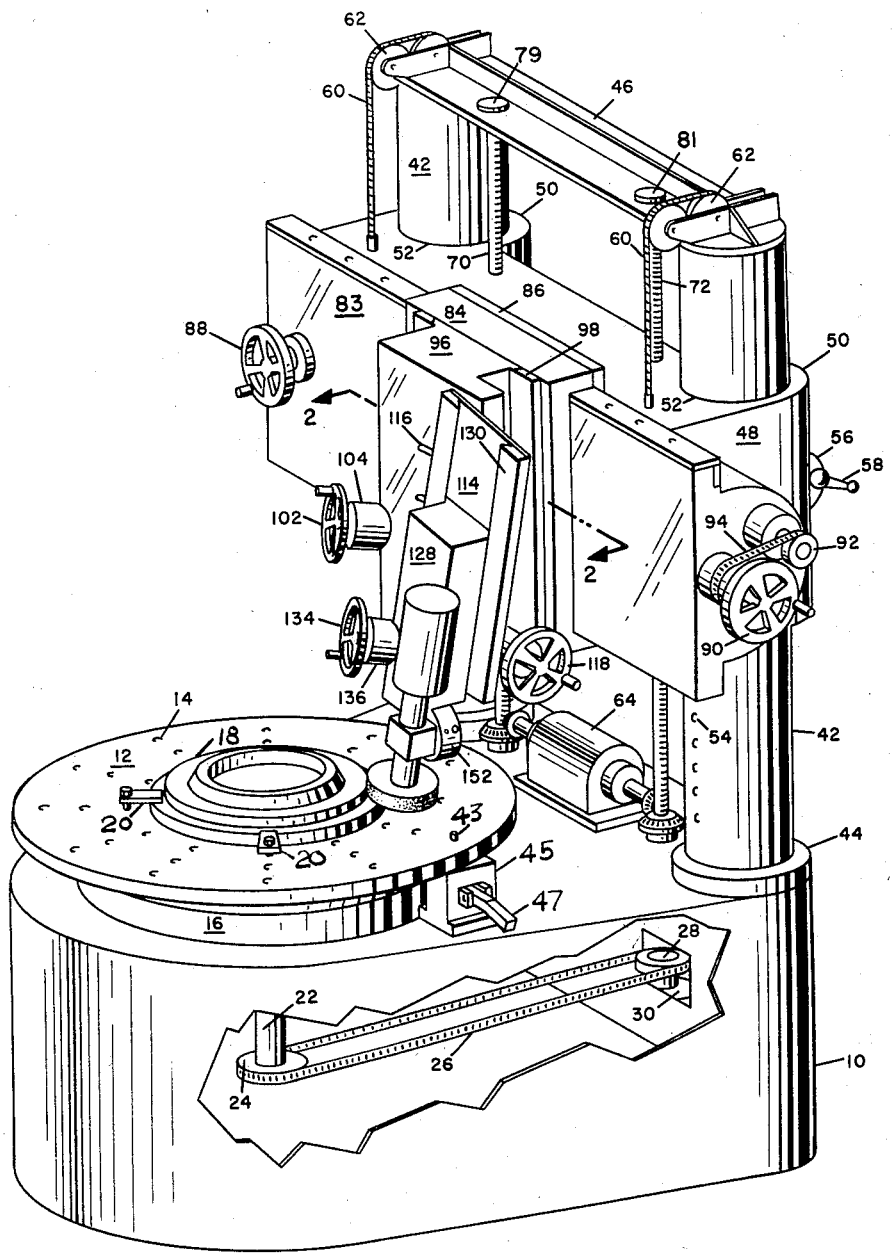
Figure 1 is a perspective view of a preferred embodiment of the present invention, partly broken away, to more clearly illustrate certain areas of the mechanism.
Figure 2:
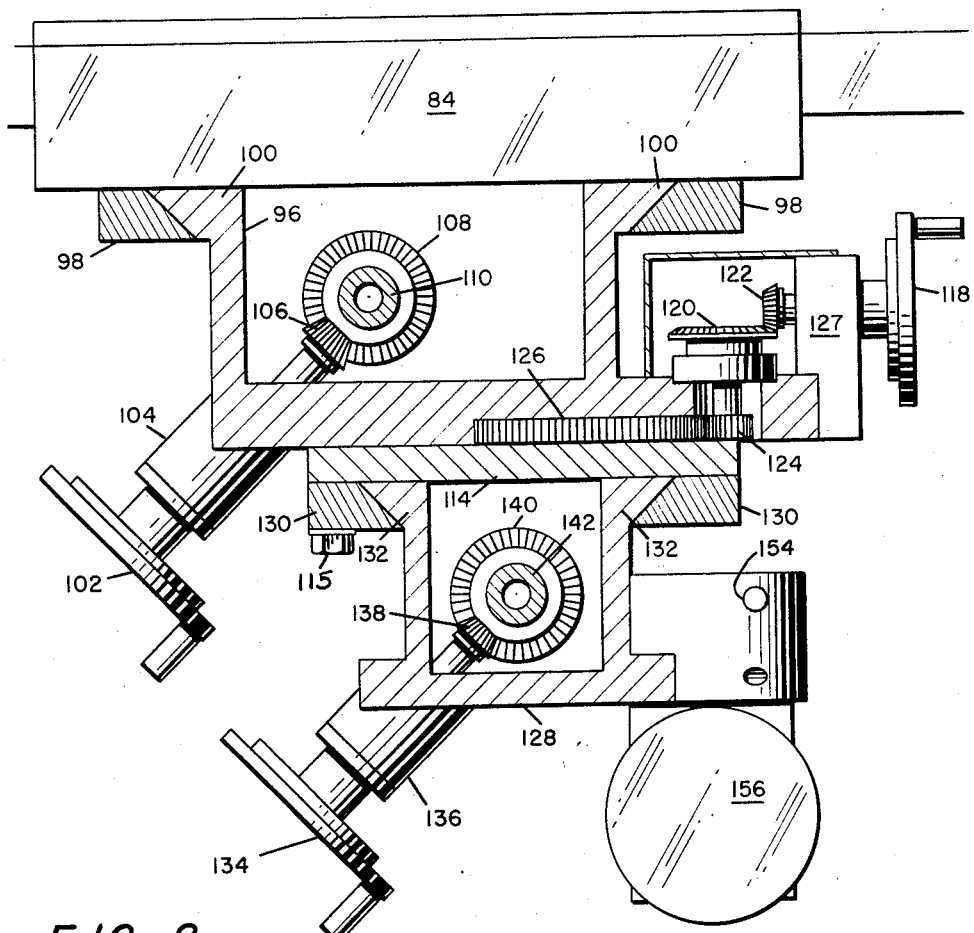
Figure 2 is a plan cross section of the machine taken along lines 2—2 of Figure 1.
Figure 5:
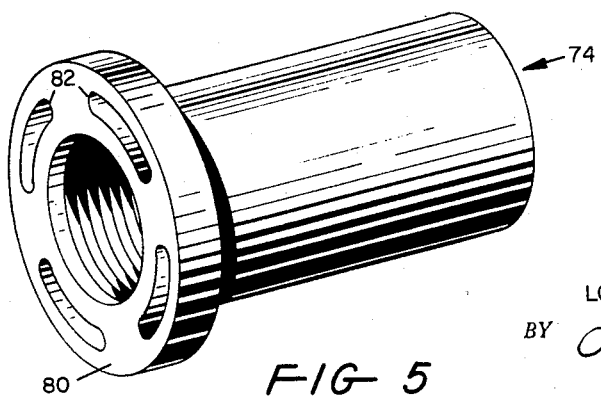
Figure 5 is a detailed view of the special elevating screw adjusting mechanism.

The threaded shafts 70 and 72 each mesh with adjustable nuts 74 which are attached by means of screws 76 to cylindrical retaining members 78 which are in turn screwed to the horizontal cross rail 48. The construction of the adjustable nut 74 is detailed in Figure 5. The nut has a rounded head 80 which has four disposed vertical slots 82 cut in its surface. The screws 76 pass through the slots 82 and into female threaded holes in the retaining members 78. The exact radial position of the adjustable nut 74 with respect to the horizontal cross rail 48 may be adjusted because of the elongation of the slots 82. This radial adjustment is utilized to accurately align the cross rail 48 in a true horizontal disposition.

The work table 12 may be stopped against rotation by a short pin 43 which is supported in a retainer 45 which biases the pin 43 in an upward direction. A handle 47 lowers the pin out of a bushing lined hole 14 in the table 12 when it is lifted. The table may then be rotated.

The front surface 83 of the cross rail 48 is finely finished to provide a bearing surface. Similarly, the top and bottom and black edges of the front portion of the cross rail 48 are finely finished. A horizontal cross slide 84 surrounds the upper, lower and front facings of the front portion of the cross rail 48 and is equipped with back rails 86 so as to be slidably supported along the front portion of the cross rail 48.

The slide 84 may be moved along the cross rail 48 by means of either hand wheel 88 which is located on the outer surface of the slide 83 or hand wheel 90 which is located at the right hand edge of the surface 83. Both of the hand wheels 88 and 90 rotate the lead screw (not shown) which is surrounded by a nut that is affixed to the slide 84. This slide actuating mechanism is similar to those for moving the other slides which will be described in more detail subsequently. An electric motor 92 is connected to the hand wheel 90 by means of a cog wheel and belt 94 so that the slide 84 may be automatically moved across the cross rail 48 at a uniform rate when such motion is desired.

A vertical slide 96 is supported for vertical movement on the horizontal cross slide 84 by means of hardened and ground ways 98 which are affixed to the front surface slide 84 and which bear against similar ways 100 which are fixed to the vertical slide 96.

A hand wheel 102 which is journaled in a bearing 104 that is integral with the vertical slide 96 operates to rotate a bevel pinion 106 which meshes with the bevel gear 108 to rotate a shaft 110. The shaft 110 is fixed in bearings in the upper and lower ends of the vertical slide 96. A nut 112 which is affixed to the horizontal slide 84 surrounds the threaded shaft 110 so as to be in mesh with it. As the hand wheel 102 is rotated the shaft 110 rotates and moves the vertical slide 96 along the ways 98 and 100.

An inclinable slide 114 is supported on the front face of the vertical slide 96 by a pin 115 and by two T-bolts which operate the slots 116 on the face of the slide 96. The inclinable slide 114 is positioned by means of a hand wheel 118 which rotates a bevel gear 120 through a driving pinion 122. The gears 120 and 122 form a right angle drive which powers another pinion gear 124 which meshes with a gear segment 126 which is affixed to the inclinable slide 114. The handle 118 and the gear 122 are supported in an extension 127 of the vertical slide 96.

Another slide, termed a longitudinal slide 128, is supported for movement along the length of the inclinable slide 114 by means of hardening and ground ways 130 which are fixed to the inclinable slide 114 and mating slides 132 which are integral with the longitudinal slide. Movement of the longitudinal slide 128 is actuated by the hand wheel 134 which operates in a bearing 136 disposed in the longitudinal slide 128 so as to rotate a bevel gear 138. The bevel gear 138 communicates with another bevel gear 140 which rotates a shaft 142. The shaft 142 is journalled at both its ends in the longitudinal slide 128. The shaft 142 is threaded along its length and the nut 144 which is fixedly attached to the inclinable slide 114 surrounds the threaded shaft 142 so as to be in mesh with it and the shaft moves longitudinally as it rotates. Thus the rotation of the hand wheel 134 communicates to the gears 138 and 140 to rotate the threaded shaft 142 and move the longitudinal slide 128 along the inclinable slide 114.

A levelling bar 146 is pivotably supported in the lower left hand corner of the longitudinal slide 128 by a pin 148. When the inclinable slide 114 is in a true vertical condition the free end of the bar 146 rests on a pin 150 which projects from the slide 128 so as to maintain the bar 146 in a true horizontal position. By placing sine blocks between the bar 146 and the pin 150 the bar 146 may be brought to a horizontal position as determined by an indicator gauge or similar instrument supported on the work table 12 and the angle of the inclinable slide 114 is determined. This process allows the inclinable slide 114 to be placed at an angle with respect to the vertical with a very high degree of accuracy. The alternate position of the bar 146 which is shown in Figure 4 is assumed when the sine blocks are utilized to level it.

A boss 152 which has a central horizontal hole extends from the lower right hand corner of the longitudinal slide 128. A pin 154 which projects through the edge of the boss into the hole fixes a grinding spindle 156 which has a circular shaft which projects into the hole in the boss 152. Therefore, the angle of the spindle 156 with respect to the longitudinal slide 128 may be adjusted by varying the position of the locking pin 154 against the circular shaft of the spindle 156.

In certain operations it is desirable to obtain a motion at right angles to the direction of the vertical slide 96. This motion may be obtained by inserting the shaft 158 which supports the cross slide 160 into the hole in the boss 152 in substitution for the circular shaft of the spindle 156. The cross slide 160 carries a movable member 162 on hardened ways 164. A nut 166 which is fixed to the movable member 162 surrounds the threaded shaft 168 which may be rotated through a handle 170. The spindle 156 is then placed in the opening in a movable member 162 and traverse motion with respect to the motion of the vertical slide 96 is obtained.

The alternative position in Figure 4 shows the attachment in place on the machine.

The combination of slides provided allows the grinder to finish a wide variety of plane and circular surfaces without changing the positioning of the workpiece in its clamping fixture.

The provision of the three slides 48, 96 and 162 operating at mutually perpendicular angles to one another allows the grinding head to be disposed at any point in the cubic volume defined by the end points of travel of the three slides.

The provision of the slide 128 which operates along angular lines with respect to the three main planes allows the grinder to finish both flat and cylindrical tapered surfaces without the necessity of continually adjusting two perpendicular slides with respect to one another.

In operation the work table 12 is revolved by the electric motor 30 whenever horizontally disposed plane surfaces or vertically aligned cylindrical surfaces are being ground. Powered movement of the spindle 156 in either the vertical or horizontal direction or both through motors 64 or 92 may accompany the work rotation.

Having thus described my invention, I claim:

1. In a grinding machine, in combination: a base; two vertical columns fixed to said base and rising above it; a beam connecting the upper ends of said vertical columns; a rail mounted for vertical movement along said columns and having means operative in cooperation with said columns for stopping its movement at any particular point along said columns; adjustable means for disposing said rail in a true horizontal plane; a first slide mounted for horizontal movement along said rail; a second slide mounted for vertical movement along said first slide; a plate supported on said second slide and adjustable to various angles with respect to the vertical; a third slide mounted for movement along said plate; a grinding spindle fixedly attached to said third slide and movable therewith; and work holding means fixedly attached to said base.

2. In a grinding machine, in combination: a base; a work holding fixture rotatably supported on said base; two vertical columns rising above said base; a horizontal rail supported by said columns and adjustable to various vertical positions on said columns; a plurality of slides disposed on said rail so as to provide movement along three mutually perpendicular axes; and a grinding spindle supported on said slides at angles adjustable with respect to the vertical.

3. In a grinding machine, in combination: a base; a work support fixed to said base; a first slide arranged for vertical movement with respect to said base; a second slide disposed on said first slide and arranged for horizontal movement with respect to said first slide; a third slide disposed on said second slide and arranged for vertical movement with respect to said second slide; a fourth slide disposed on said third slide and arranged for angular movement in the plane defined by the movements of said second and third slides; a fifth slide disposed on said fourth slide and arranged for movement in a direction perpendicular to the movements of said second and third slides; and a grinder spindle disposed on said fifth slide for movement therewith.

4. In a grinding machine, in combination: a base; a work support disposed on said base; a first slide arranged for horizontal movement with respect to said base; a second slide arranged for vertical movement with respect to said first slide; a third slide arranged for movement in a direction perpendicular to the movements of said first and second slides; and a grinder spindle disposed on said third slide for movement therewith.

5. In a grinding machine, in combination: a base; a work support disposed on said base and arranged for rotation about a vertical axis; a first slide arranged for horizontal movement with respect to said base; a second slide disposed on said first slide and arranged for vertical movement with respect thereto; a third slide disposed on said second slide and arranged for movement along angular lines in the plane defined by the movements of said first and second slides; a fourth slide disposed on said third slide and arranged for motion in a direction perpendicular to the motions of said first and second slides; and a grinder spindle disposed on said fourth slide for movement therewith.

6. In a grinding machine, in combination: a base; a work support disposed on said base and arranged for rotation about a fixed axis; a first slide arranged for movement along a first line with respect to said base; a second slide disposed on said first slide and arranged for motion along a second line which is perpendicular to said first line; a third slide disposed on said second slide and arranged for angular movement in the plane defined by the movements of said first and second planes; and a grinder spindle disposed on said third slide for motion therewith.

References Cited in the file of this patent
UNITED STATES PATENTS

| 985,412 | Hattersley et al. | Feb. 28, 1911 |
| 1,752,961 | Oliver | Apr. 1, 1930 |
| 2,792,036 | Buttke | May 14, 1957 |